United States Patent [19]
Gavin

[11] Patent Number: 5,871,640
[45] Date of Patent: Feb. 16, 1999

[54] FILTER AND HOUSING

[76] Inventor: Norman Gavin, 2545 Ridge Rd., North Haven, Conn. 06473

[21] Appl. No.: 823,868

[22] Filed: Mar. 25, 1997

[51] Int. Cl.⁶ .................................................. B01D 29/33
[52] U.S. Cl. .......................... 210/123; 210/234; 210/235; 210/299; 210/523.2; 210/429; 210/441; 210/532.2; 210/256
[58] Field of Search .................................... 210/123, 170, 210/234, 235, 238, 256, 299, 308, 311, 316, 323.2, 335, 339, 418, 429, 441, 461, 470, 494.1, 498, 532.2

[56] References Cited

U.S. PATENT DOCUMENTS

| | | |
|---|---|---|
| 19,030 | 1/1858 | Ingram . |
| 1,902,171 | 3/1933 | Kupp . |
| 2,364,472 | 5/1944 | Platt . |
| 2,591,248 | 4/1952 | Francois .................................. 210/234 |
| 2,606,663 | 8/1952 | Blackman et al. . |
| 2,684,763 | 7/1954 | Siskavitch ............................... 210/238 |
| 2,767,801 | 10/1956 | Eads . |
| 2,900,084 | 8/1959 | Zabel . |
| 3,025,962 | 3/1962 | Williams . |
| 3,272,337 | 9/1966 | Elwell .................................... 210/234 |
| 3,332,552 | 7/1967 | Zabel . |
| 3,390,778 | 7/1968 | Uhen ...................................... 210/335 |
| 3,612,279 | 10/1971 | Hostetter . |
| 3,630,370 | 12/1971 | Quina .................................... 210/532.2 |
| 3,662,890 | 5/1972 | Gremshaw . |
| 3,954,612 | 5/1976 | Wilkerson . |
| 4,082,676 | 4/1978 | Dulger . |
| 4,172,799 | 10/1979 | Perry, Jr. ............................... 210/532.2 |
| 4,179,372 | 12/1979 | Rosaen . |
| 4,207,631 | 6/1980 | Baggey ................................... 210/238 |
| 4,278,455 | 7/1981 | Nardi . |
| 4,319,998 | 3/1982 | Anderson . |
| 4,348,278 | 9/1982 | Caccia . |
| 4,439,323 | 3/1984 | Ball . |
| 4,465,594 | 8/1984 | Laak . |
| 4,552,662 | 11/1985 | Webster et al. ......................... 210/335 |
| 4,673,494 | 6/1987 | Krofta . |
| 4,699,715 | 10/1987 | Lee, II ................................... 210/494.1 |
| 4,710,245 | 12/1987 | Zabel . |
| 4,715,966 | 12/1987 | Bowman . |
| 4,818,384 | 4/1989 | Mayer . |
| 4,832,846 | 5/1989 | Gavin ................................... 210/532.2 |
| 4,867,871 | 9/1989 | Bowne . |
| 4,895,645 | 1/1990 | Zorich, Jr. . |
| 4,931,180 | 6/1990 | Darchambeau . |
| 4,971,690 | 11/1990 | Justice . |
| 5,032,287 | 7/1991 | Salmond . |
| 5,106,493 | 4/1992 | McIntosh . |
| 5,198,113 | 3/1993 | Daniels . |
| 5,207,896 | 5/1993 | Graves . |
| 5,242,584 | 9/1993 | Hoarau . |
| 5,252,000 | 10/1993 | Mohs . |

(List continued on next page.)

FOREIGN PATENT DOCUMENTS 14434  12/1895  United Kingdom .

*Primary Examiner*—Christopher Upton
*Attorney, Agent, or Firm*—Robert A. Seemann

[57] ABSTRACT

A septic tank filter system comprises a mounting member adapted for attachment to an interior surface of a septic system tank, at least one open-ended, cylindrical filter housing fixed to the mounting member, and a hollow foraminated filter nested in each filter housing. The filter has a first conduit providing a fluid flow connection between the filter interior and an outlet port in the filter housing. Liquid sewage is filtered during passage from the outside of the filter to its interior. Filtrate flows through the first conduit, then through the filter housing outlet port, thence through the mounting member and finally exits the tank through the outlet pipe in the tank wall. A score line in the filter housing side wall permits ready removal of a section thereof to form an inlet port. Telescoping channel members on the outside of the filter housings allow them to be interconnected with the outlet port of one in fluid flow connection with the inlet port of another. A second conduit in the filters provides fluid flow communication between the filter housing inlet port and the filter interior.

6 Claims, 10 Drawing Sheets

U.S. PATENT DOCUMENTS

| | | |
|---|---|---|
| 5,264,120 | 11/1993 | Graves . |
| 5,281,332 | 1/1994 | Vandervelde et al. . |
| 5,308,479 | 5/1994 | Iwai et al. . |
| 5,360,556 | 11/1994 | Ball et al. . |
| 5,382,357 | 1/1995 | Nurse . |
| 5,387,335 | 2/1995 | Iwai et al. . |
| 5,427,679 | 6/1995 | Daniels . |
| 5,480,561 | 1/1996 | Ball et al. . |
| 5,482,621 | 1/1996 | Nurse . |
| 5,492,635 | 2/1996 | Ball . |
| 5,531,891 | 7/1996 | Von Meier . |
| 5,531,894 | 7/1996 | Ball et al. . |
| 5,569,387 | 10/1996 | Bowne et al. . |

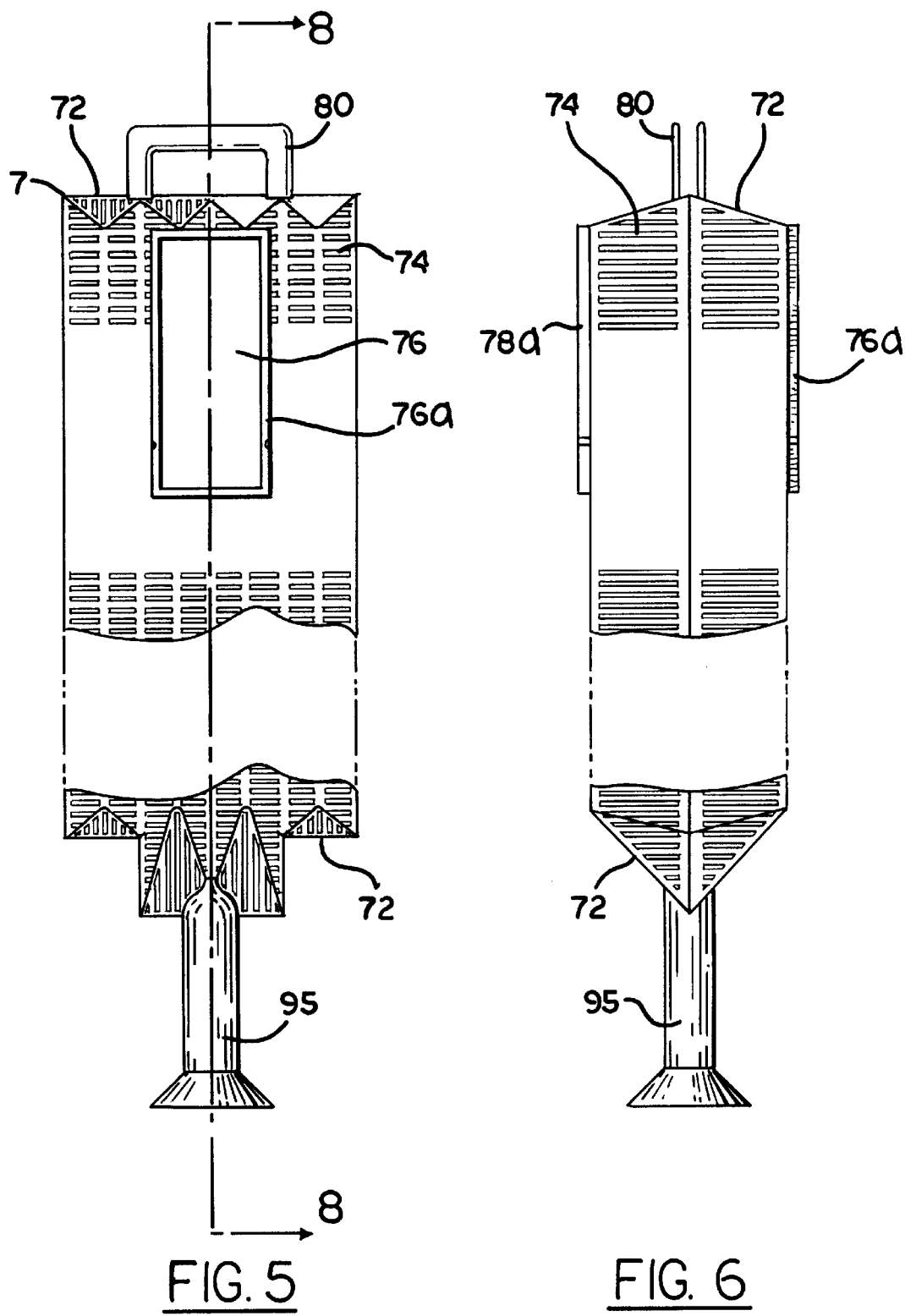

FILTER AND HOUSING

BACKGROUND OF THE INVENTION

The present invention pertains to septic systems and, more particularly, to a filter system for use in a septic system tank.

Domestic septic systems generally include a boxlike underground concrete tank into which wastes are deposited and where they are subjected to bacterial action. Normally, the tank is partly filled with liquid on top of which floats a so-called "scum layer" of solid and semi-solid waste matter. The vertical location of the scum layer changes over time as the amount of liquid in the tank fluctuates. A second layer of solid or semi-solid matter rests on the bottom of the tank.

Liquid from the tank is passed to an underground distribution box where the flow is divided between a number of underground feeder lines. The feeder lines distribute the liquid throughout a leach field, allowing it to ultimately return to the water table.

In order to avoid clogging of the feeder line openings or damage to the leach field, it is important that the scum and other solid or semi-solid matter be retained in the tank and prevented from entering into the liquid distribution system. To some extent, this may be accomplished by placement of the tank outlet in the comparatively clear liquid beneath the scum layer and above the tank bottom. However, due to the ever changing location of the scum level, this solution can not be wholly successful. Attempts have also been made to filter the liquid leaving the tank. Such attempts are ultimately frustrated, however, by scum clogging the filter pores.

Accordingly, it is an object of the present invention to provide a novel filter system for use in a septic system tank which effectively filters outflow from the tank while avoiding clogging.

It is also an object to provide such a filter system which may be used in septic systems of differing capacities and flow rates.

Another object is to provide such a filter system which is inexpensive to fabricate and readily installed in the tank.

Still another object is to provide such a filter system wherein the filter may be readily removed for cleaning or replacement.

SUMMARY OF THE INVENTION

It has now been found that the foregoing and related objects may be readily attained in a septic tank filter system comprising a mounting member adapted for attachment to an interior surface of a septic system tank, at least one filter housing fixed to the mounting member, and a hollow foraminated filter nested in each filter housing. The filter housing is open at both ends and has an elongated, generally cylindrical side wall with an outlet port. It is disposed with its open ends in vertical alignment. The filter has a first conduit providing a fluid flow connection between the filter interior and the filter housing outlet port. The mounting member provides a fluid flow connection between the filter housing outlet port and an outlet in the septic tank wall.

Filtrate from the filter interior flows through the first conduit, then through the filter housing outlet port, thence through the mounting member, finally exiting the tank through the septic tank outlet.

Advantageously, a weakening or score line in the filter housing side wall permits ready removal of a section thereof to form an inlet port. Telescoping channel members on the outside of the filter housings allow them to be interconnected with the outlet port of one in fluid flow connection with the inlet port of another. A second conduit in the filter provides fluid flow communication between the filter housing inlet port and the filter interior. It is thus possible to increase the capacity of the system by joining two or more filter housings, each with a filter nested therein.

Preferably, a closure device operatively connected to the filter closes the open lower end of the filter housing when the filter is removed. In one embodiment, this closure device comprises a buoyant member adapted to substantially block fluid flow through the lower open end of the filter housing and a rod projecting from the bottom of the filter and engageable with the buoyant member to maintain the buoyant member in spaced relation to the opening.

In one embodiment, the filter system includes a gas deflector fixed to the filter housing below its lower open end.

Desirably, each filter comprises a pair of spaced apart walls of generally saw-tooth configuration, each wall having a plurality of rows of parallel slits. Advantageously, a filter handle protruding from the open upper end of the filter housing facilitates filter removal for replacement or cleaning.

BRIEF DESCRIPTION OF THE DRAWINGS

FIG. 5 is a front view of a filter in accord with the present invention;

FIG. 6 is a side view of the filter of FIG. 5;

DETAILED DESCRIPTION OF THE PREFERRED EMBODIMENT

Figure 1:
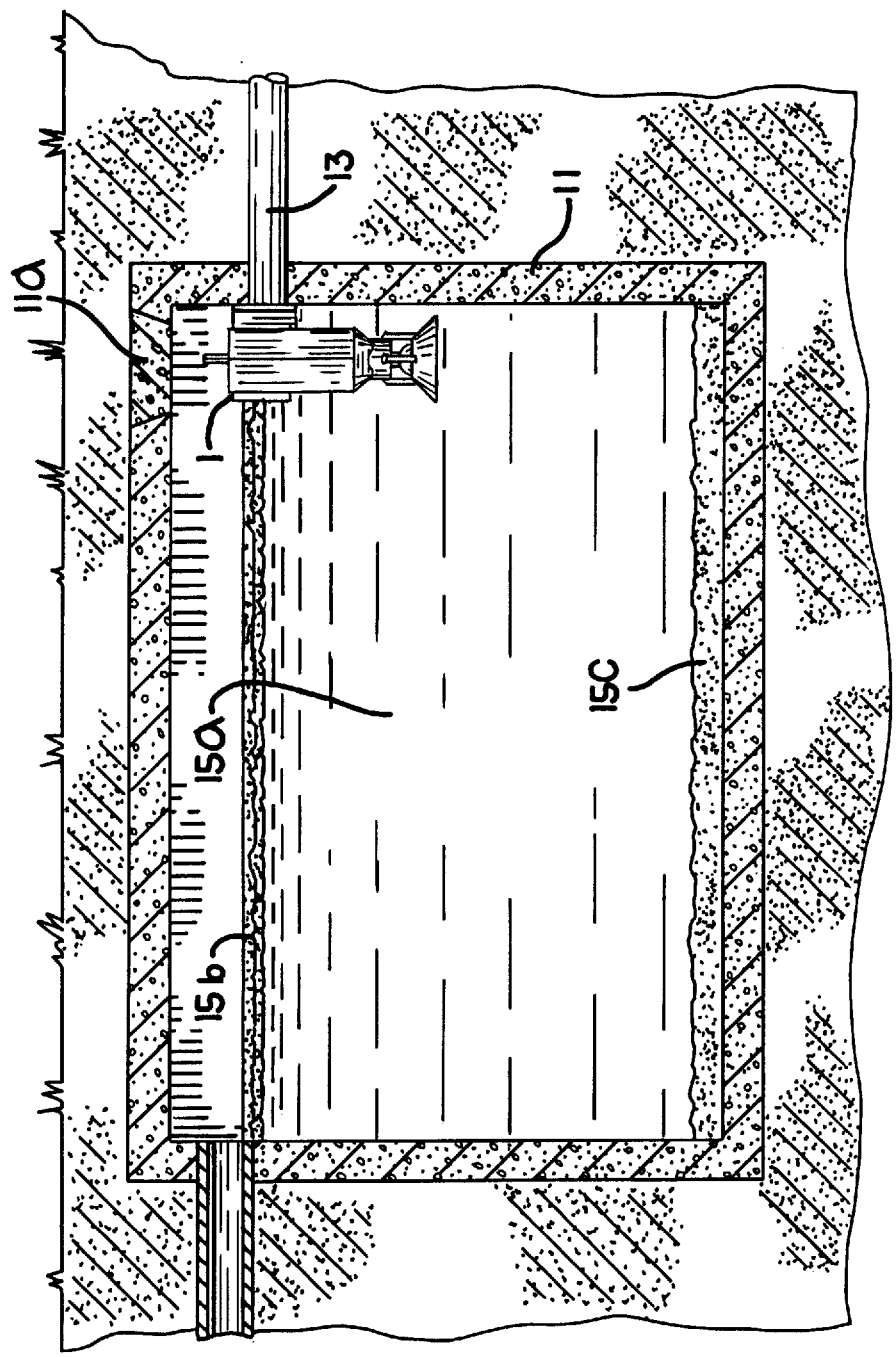
FIG. 1 is a cross sectional view of a typical septic system tank illustrating the placement of a filter system in accord with the present invention.
Figure 2:
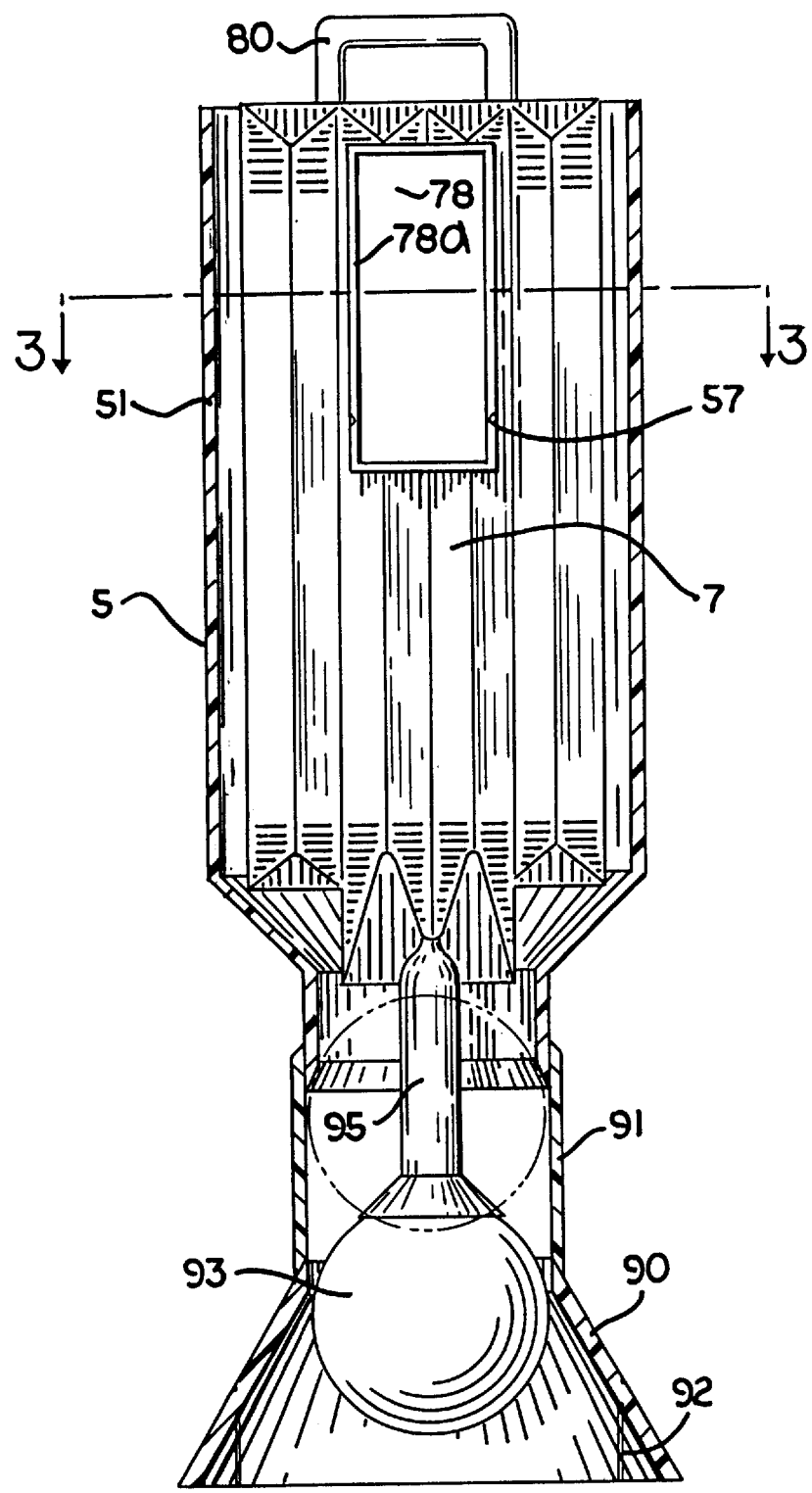
FIG. 2 is a vertical cross sectional view of a filter system in accord with the present invention.

Turning first to FIG. 1 of the attached drawings, therein illustrated is a septic tank filter system embodying the present invention and generally designated by the numeral 1. The filter system is disposed inside the septic tank 11, attached to the tank wall in covering relation to the tank outlet pipe 13. Typically, the tank 11 is partly filled with liquid 15a on top of which floats a scum layer of solid and semi-solid waste matter 15b. A second scum layer 15c rests on the bottom of the tank 11. Ideally, the outlet pipe 13 is at a level between the two scum layers 15b and 15c. However, it is to be noted that the vertical location of the upper layer 15b changes over time as the amount of liquid 15a in the tank 11 fluctuates.

Figure 3:
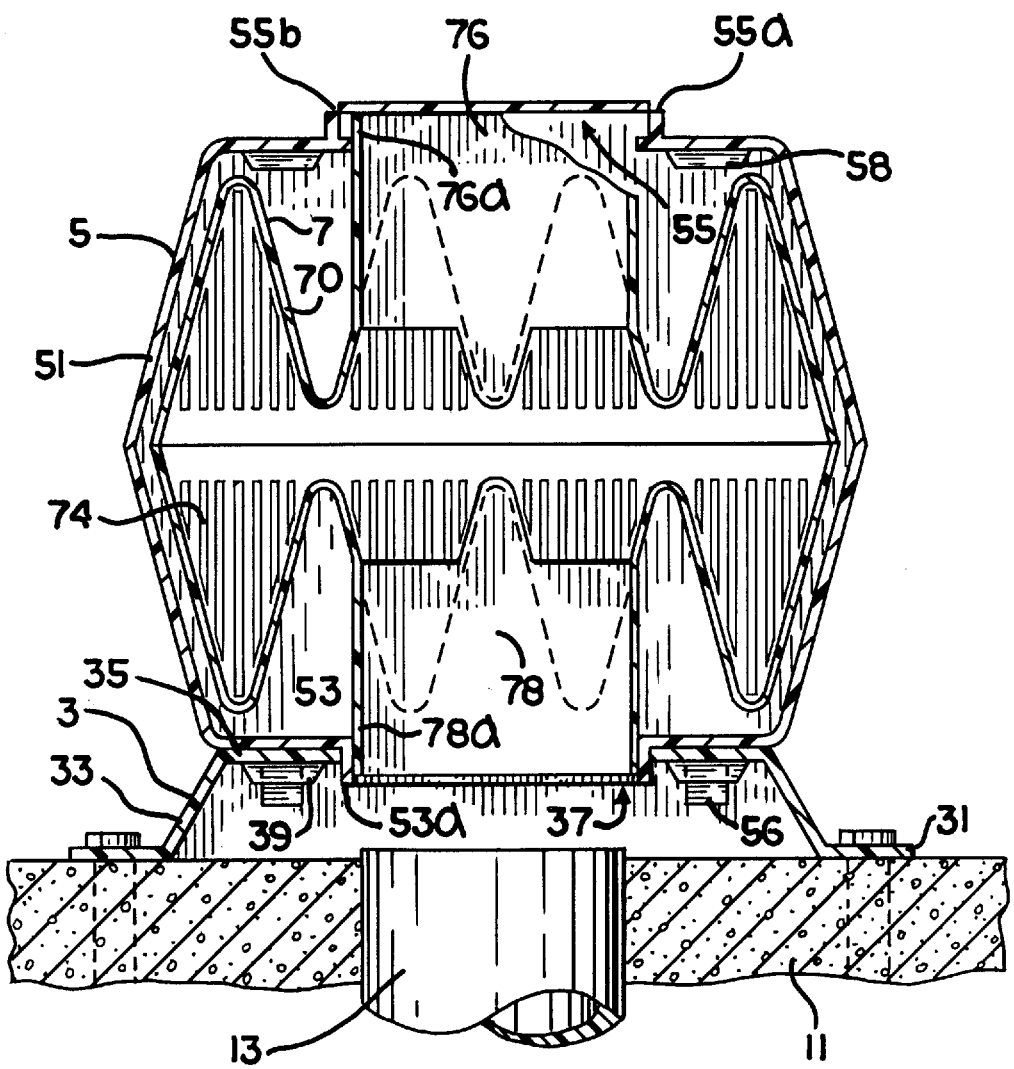
FIG. 3 is a cross sectional view taken along line 3—3 of FIG. 2.
Figure 4:
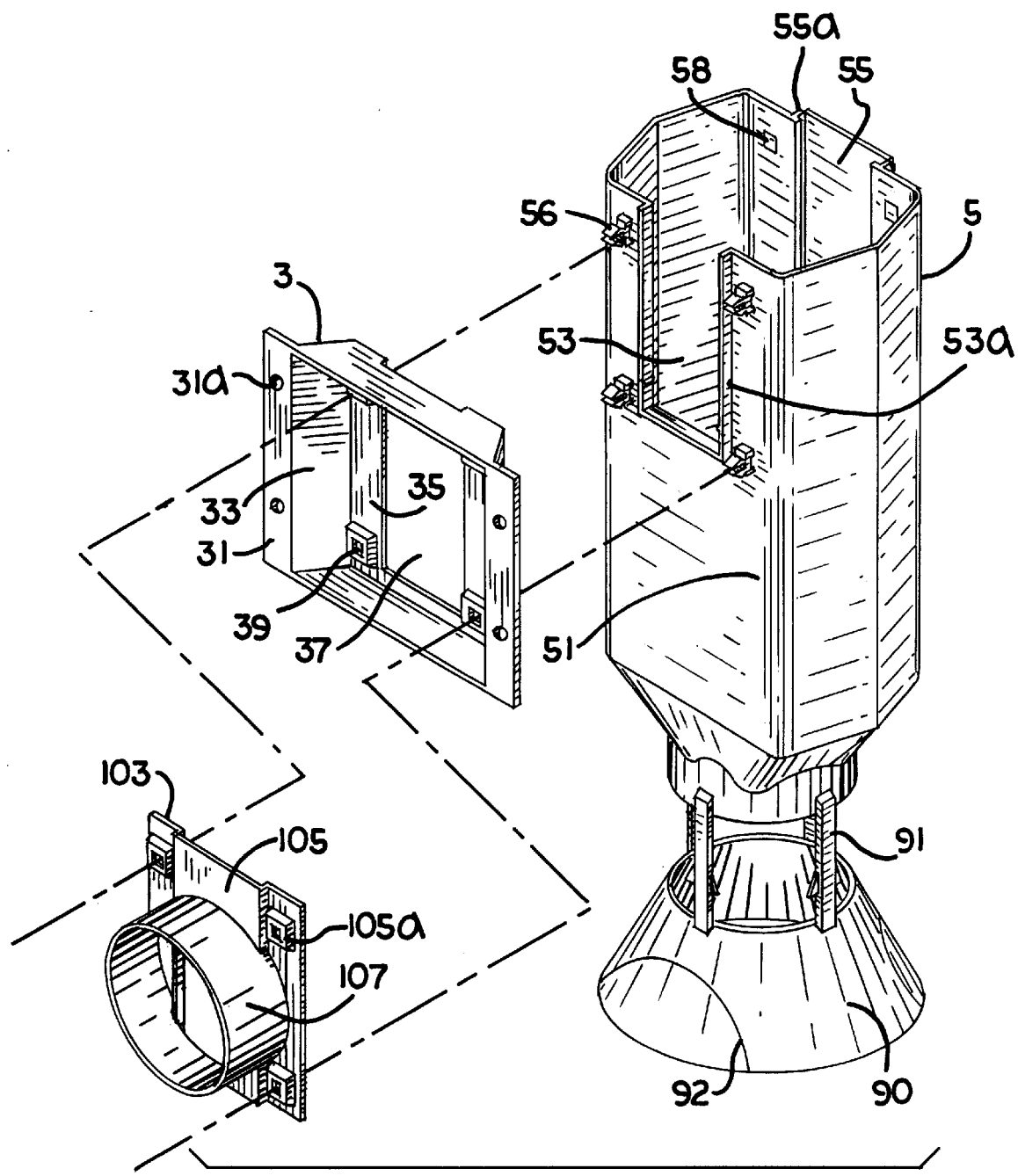
FIG. 4 is a perspective view of a filter housing and two embodiments of mounting members in accord with the present invention.
Figure 7:
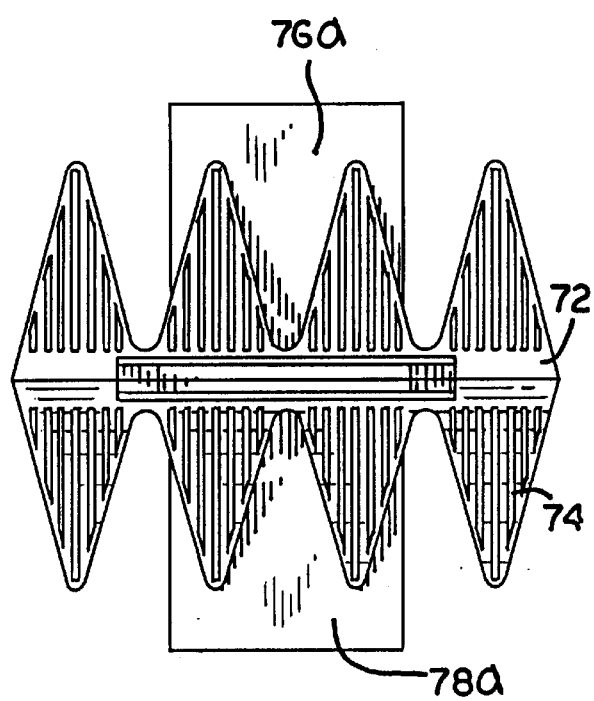
FIG. 7 is a top view of the filter of FIG. 5.
Figure 8:
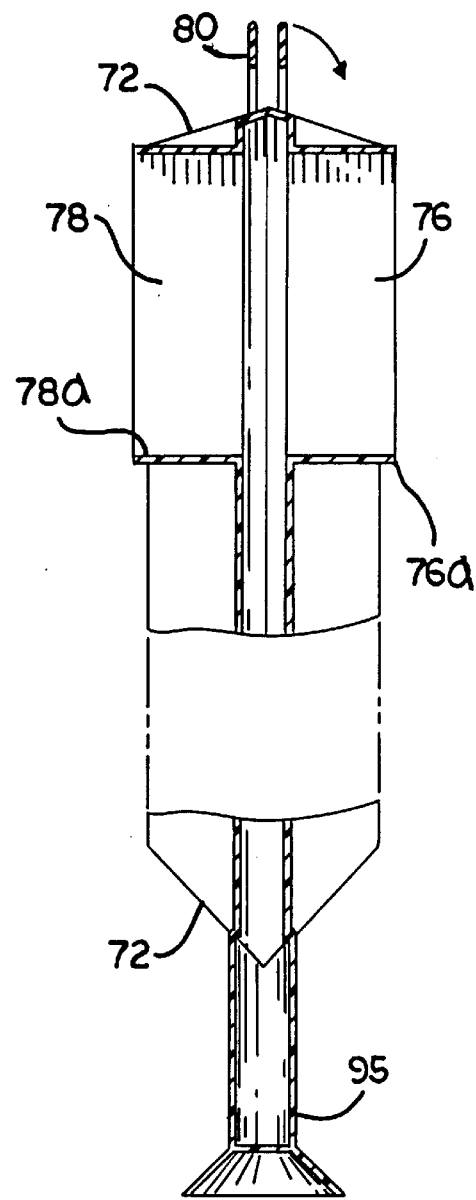
FIG. 8 is a cross sectional view taken along line 8—8 of FIG. 5.
Figure 11:
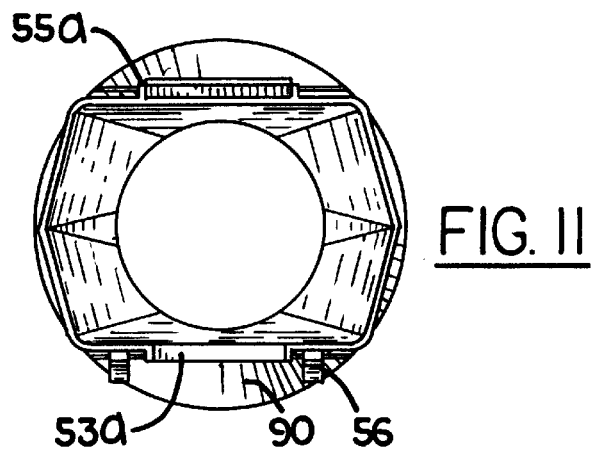
FIG. 11 is a top view of the filter housing of FIG. 4.
Figure 9:
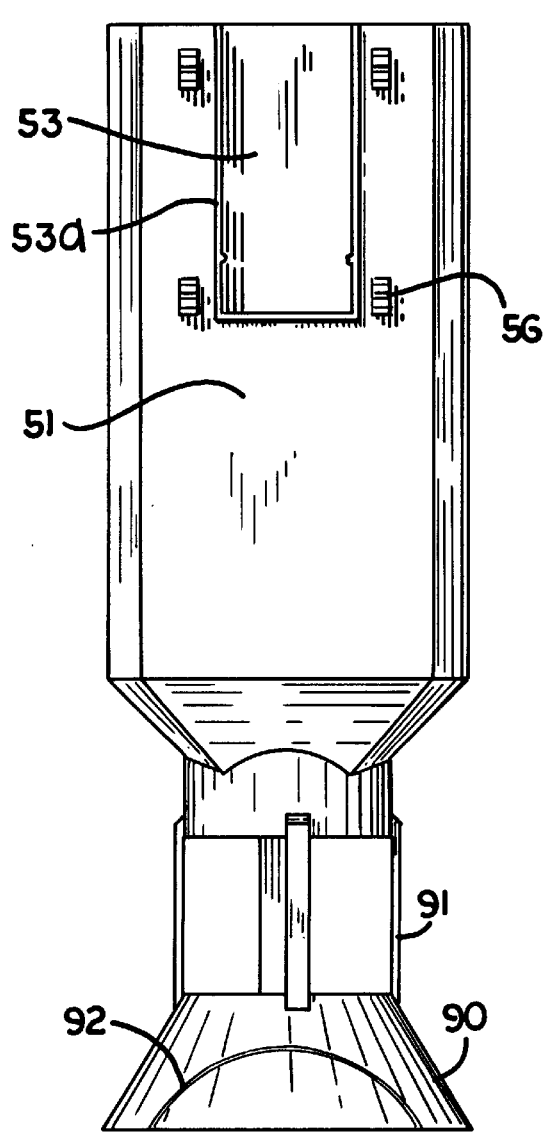
FIG. 9 is a front view of the filter housing of FIG. 4.
Figure 10:
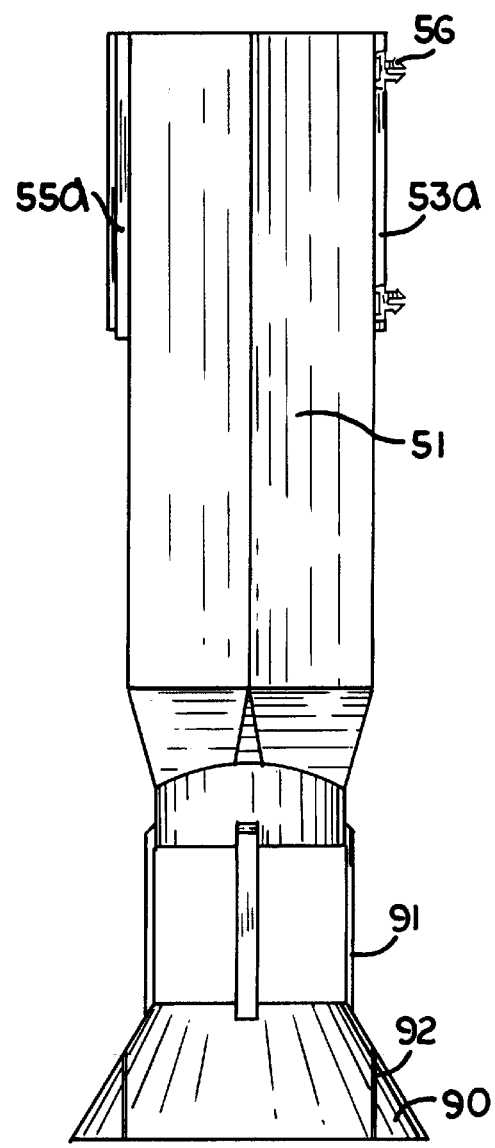
FIG. 10 is a side view of the filter housing of FIG. 4.

As best seen in FIG. 3, the filter system 1 comprises a mounting member 3, a filter housing 5 fixed to the mounting member 3, and a filter 7 nested in the filter housing 5.

The mounting member 3 includes a base 31, which is screwed or otherwise mechanically attached to an inner wall surface of the tank 11, and a generally pyramidal wall 33 joined to the base 31. The mounting member 3 surrounds the tank outlet pipe 13 which is in fluid flow communication with the mounting member interior. Parallel to the mounting member base 31 is a top wall 35 having at its center, a rectangular inlet port 37.

The filter housing 5 has an elongate, generally cylindrical sidewall 51 open at both ends. An outlet port 53 is formed in the sidewall 51. A flange 53a, which runs along the sides and bottom of the outlet port 53 on the exterior of the sidewall 51, is telescopically received by the edge of the mounting member inlet port 37. Proximate the corners of the outlet port 53 are four resilient capture members 56 which are engageable with four recessed apertures 39 in the mounting member top wall 35 to fix the filter housing 5 to the mounting member 3.

The mounting member 3 and the filter housing 5 are arranged such that the filter housing 5 may be readily and conveniently slid into place in the mounting member 3, after the latter has been fastened to the tank wall. To facilitate fabrication of the filter housing 5, the outlet port 53 may be located at an upper edge of the sidewall 51 such that it comprises a generally U-shaped cutout, open at the top. If desired, the filter system capacity may be increased by connecting, in series, two or more filter units, each comprising a filter housing 5 with a filter 7 nested therein. To this end, a section of the sidewall 51 defined by a score line or weakening line 55b is removable to form an inlet port 55. The inlet port 55 formed by removal of the defined sidewall section is opposite the outlet port 53 and, like the outlet port 53, is bordered by a flange 55a. Proximate the corners of the inlet port 55 are four recessed apertures 58 which are preferably sealed by a readily burstable membrane.

Figure 16:
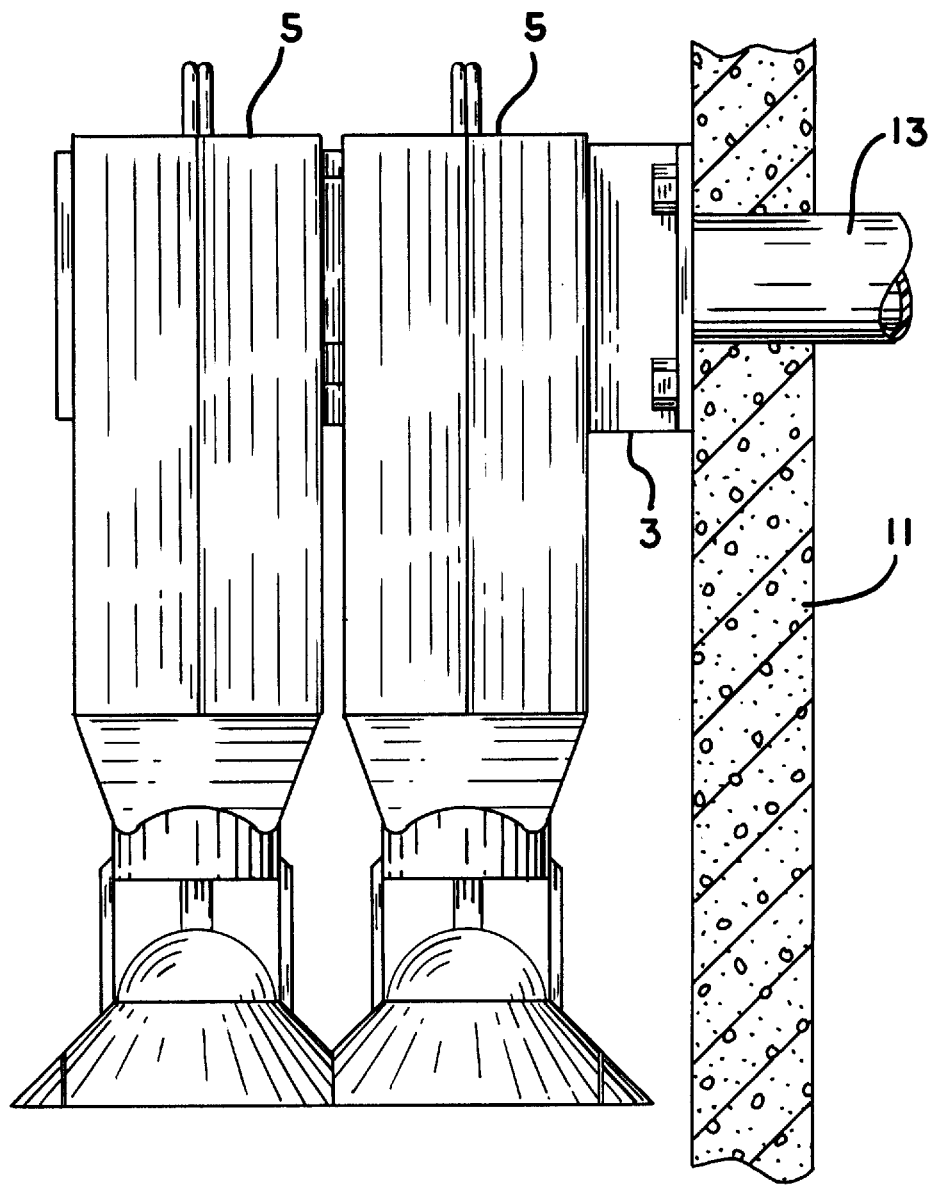
FIG. 16 is a side view of two filter housings joined together.

To operatively connect two filter housings as illustrated in FIG. 16, the defined section of sidewall 51 of one is first removed so as to open or create the inlet port 55. The outlet port flange 53a of a second filter housing is then inserted into the inlet port 55 thus created. During this insertion, the capture members 56 on the second filter housing pierce the covering membranes and enter the apertures 58 of the first filter housing thereby fastening the two filter housings together. If desired, a third filter housing may be attached to the second in the same manner.

The filter 7, which is illustrated in FIGS. 5–8, is a hollow member having sidewalls 70 of a generally sawtooth configuration. The sidewalls 70 and the end walls 72 are formed with a number of rows of narrow, parallel slits 74. Near the top of the filter 7 and communicating with its interior, are opposed generally square inlet and outlet ports 76 and 78 which are in fluid flow communication. If multiple filter units are connected in series, filtrate from one unit may enter the filter inlet port 76 of an adjacent unit, pass directly through the filter 7, and exit through the outlet port 78. The ports 76 and 78 are framed by projecting flanges 76a and 78a which are slidingly received in the filter housing outlet and inlet ports 53 and 55 respectively when the filter 7 is inserted into the filter housing 5. Projections 57 on the filter housing flanges 53a and 55a are received in detents in the filter flanges 76a and 78a to lock the filter 7 into the filter housing 5 and prevent it floating out of position. A two-part folding handle 80 on the top of the filter 7 protrudes from the open upper end of the filter housing 5 and facilitates filter removal for replacement or cleaning. The handle 80 is foldable between an upright position, wherein it may be readily grasped and a folded position, wherein it lies substantially parallel to the end wall 72 of the filter 7, permitting closure of the access hatch 11a of the tank 11.

The biological processes occurring at the bottom of the septic tank 11 generate gas bubbles which float upward through the liquid 15, often carrying sizable chunks of entrained particulate matter. If allowed to proceed unchecked, the bubbles will enter the filter housing 5 and deposit the particulates on the filter 7, soon clogging it. To avoid this problem, a frustoconical gas deflector 90 is fastened to the filter housing 5 below its open lower end. The deflector 90 is carried on four support straps 91 which depend from the filter housing 5. A pair of parallel weakening lines or score lines 92 are formed in the gas deflector 90 to facilitate removal of chordal sections thereof which is necessary when filter units are to be serially fastened together.

A buoyant ball 93 is loosely captured between the gas deflector 90 and the filter housing 5 and within the circle of the support straps 91. If left unhindered, the ball 93 would float upward and seal the lower opening of the filter housing 5. It is however, maintained in spaced relation to the housing 5 by a protruding rod 95 fixed to the bottom of the filter 7. It will be appreciated by the reader that it is only the presence of the filter 7 and its attached rod 95 which prevents the ball 93 from sealing the lower end of the filter housing 5. If the filter 7 is removed from the housing 5, the latter is sealed by the ball 93 thereby preventing unfiltered sewage from escaping the tank 11.

Figure 12:
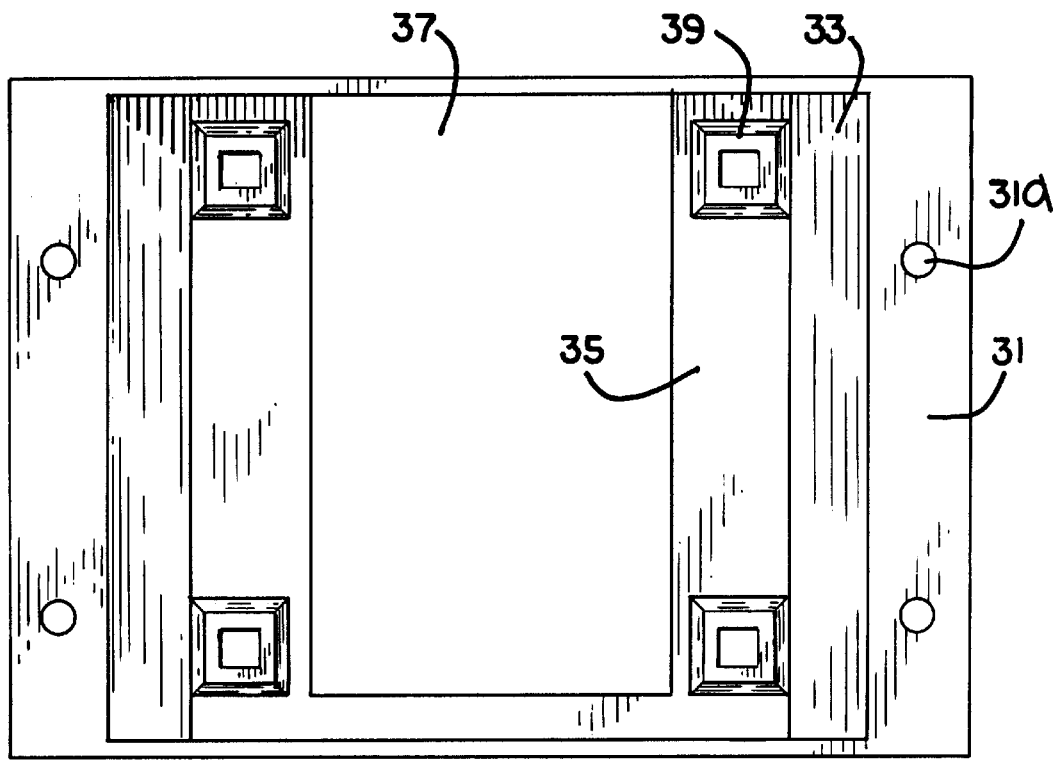
FIG. 12 is a front view of a mounting member in accord with the present invention.
Figure 13:
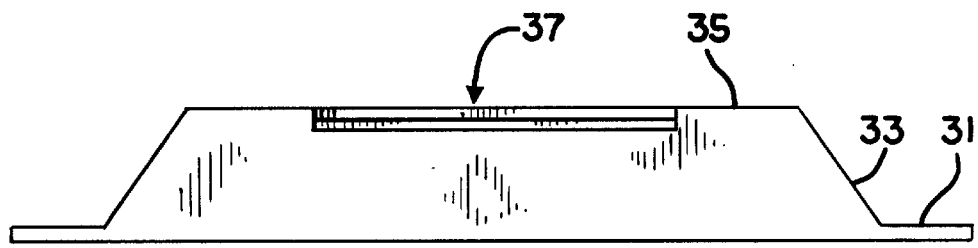
FIG. 13 is a top view of the mounting member of FIG. 12.
Figure 14:
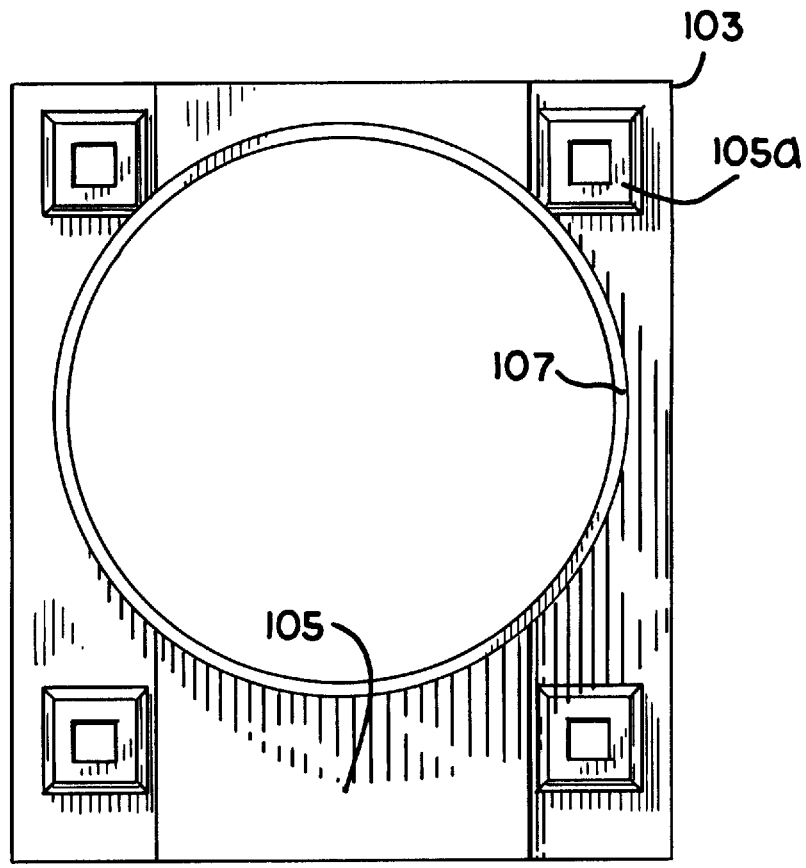
FIG. 14 is a front view of a second mounting member in accord with the present invention.
Figure 15:
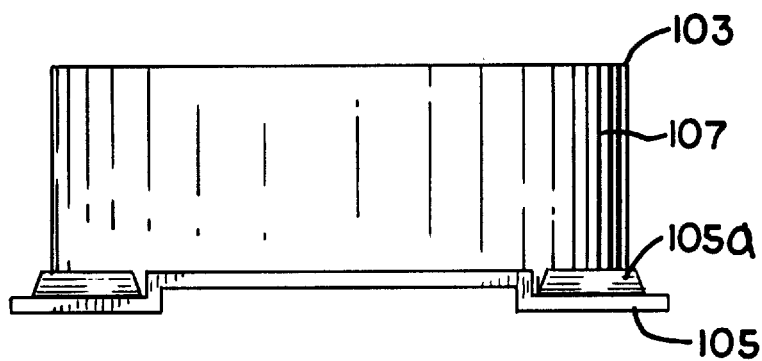
FIG. 15 is a top view of the mounting member of FIG. 14.

The mounting member 3 illustrated in FIGS. 12 and 13 is most advantageously employed in conjunction with a septic tank 11 employing a POLYLOK™ aperture closure member which provides screw receiving areas in the tank wall surrounding the tank outlet pipe 13. These holes are in registry with preformed holes 31a in the mounting member base 31. If it is desired to install a filter system in accord with the present invention in a septic tank which does not have this aperture closure member, it may be preferable to utilize a mounting member 103 as shown in FIGS. 14 and 15. The mounting member 103 includes a generally planar base portion 105 with a projecting cylindrical body 107 adapted to be inserted into the tank outlet pipe 13 and adhesively fixed in place. Recessed apertures 105a in the base portion 105 engagingly receive the resilient capture members 56 on the filter housing 5 to fix the latter to the mounting member 103.

Advantageously, the mounting member 3 or 103, the filter housing 5 and the filter 7 are formed from a synthetic resin.

Although the present invention has been described with respect to details of certain embodiments thereof, it is not intended that such details be limitations upon the scope of the invention. It will be obvious to those skilled in the art that various modifications and substitutions may be made without departing from the spirit and contemplation of the invention which are limited in scope only by the appended claims.

Having thus described the invention, what is claimed is:

1. A filter system for use in a septic system tank, said filter system comprising:

a mounting member adapted for attachment to an interior surface of a septic system tank;

a first filter housing having an elongated, generally cylindrical side wall, a first outlet port on the side wall, said first filter housing being open at both ends, said mounting member being fixed to said side wall and adapted to provide a fluid flow connection between said first outlet sort and an outlet in a septic tank wall, a first elongated, hollow foraminated filter nested in said first filter housing, a first conduit providing a fluid flow connection between the interior of said first filter and said first outlet port, a second filter housing having an elongated, generally cylindrical side wall, a second outlet port on the side wall of said second filter housing, said second filter housing being open at both ends, a second elongated hollow foraminated filter in said second filter housing in fluid flow connection with said second outlet port, said first filter housing including a defined section of said side wall selectively removable to form an inlet port and means for connecting said first filter housing to said second filter housing with said second outlet port of said second filter housing in fluid flow connection with said inlet port of said first filter housing.

2. The filter system of claim 1 wherein said second filter housing includes a second conduit 53a providing a fluid flow connection between the interior of said second filter housing and said first filter housing inlet port 55.

3. The filter system of claim 1 wherein said defined section of said first filter housing side wall is defined by a weakening line formed therein.

4. A filter system for use in a septic system tank, said filter system comprising:

a first filter housing having a first open end at the bottom of the housing for receiving septic tank fluid and a second open end configured for receiving a removable filter element when the first filter housing is mounted in a septic tank containing septic tank fluid, a first outlet port mounted on a surrounding wall of said first filter housing, means for mounting said first filter housing in a septic tank, fixed to said housing and adapted to provide a fluid flow connection between said first outlet port and an outlet in a septic tank wall, a first filter mounted in said first filter housing, a first conduit providing a fluid flow connection between the interior of said first filter and said first outlet port, said first filter housing including a defined section of said surrounding wall selectively removable to form an inlet port and means for connecting said first filter housing to a second predetermined filter housing so that the outlet port of said second predetermined filter housing is in fluid flow connection with said inlet port of said first filter housing.

5. The filter system of claim 4 further comprising means for sealing said first open end buoyantly responsive closingly to fluid in a septic tank when said first filter housing is mounted in a septic tank operatively connected to said filter for closing said open lower end of said filter housing when said filter is removed from said filter housing.

6. A filter system for use in a septic system tank, said filter system comprising:

a first filter housing having a first open end at the bottom of the housing for receiving septic tank fluid and a second open end configured for receiving a removable filter element when the first filter housing is mounted in a septic tank containing septic tank fluid, a first outlet port mounted on a surrounding wall of said first filter housing, means for mounting said first filter housing in a septic tank, fixed to said housing and adapted to provide a fluid flow connection between said first outlet port and an outlet in a septic tank wall, a first filter mounted in said first filter housing, a first conduit providing a fluid flow connection between the interior of said first filter and said first outlet port, means for sealing said first open end buoyantly responsive closingly to fluid in a septic tank when said first filter housing is mounted in a septic tank, operatively connected to said filter for closing said open lower end of said filter housing when said filter is removed from said filter housing.

* * * * *